UNITED STATES PATENT OFFICE.

CHARLES HARROP, OF BIRMINGHAM, COUNTY OF WARWICK, ENGLAND.

PROCESS OF VARNISHING METAL.

SPECIFICATION forming part of Letters Patent No. 392,029, dated October 30, 1888.

Application filed May 14, 1888. Serial No. 273,906. (No specimens.)

*To all whom it may concern:*

Be it known that I, CHARLES HARROP, a subject of the Queen of Great Britain, residing at Birmingham, in the county of Warwick, England, have invented certain new and useful Improvements in Varnishing and Lacquering Metal Goods; and I do hereby declare that the following is a full, clear, and exact description of the invention, which will enable others skilled in the art to which it appertains to make and use the same.

Hitherto it has been customary to prepare polished metal goods for the reception of the lacquer or varnish by first dipping them into a solution of suitable chemicals in order to clean the surface, then to rinse off any excess of chemicals in water and to dry the goods in sawdust, and finally to remove the sawdust before applying the lacquer or varnish. The removal of the sawdust is troublesome, and unless great care is exercised some of it clings to the work and mars the lacquering.

I have discovered that by using non-hygroscopic lacquers or varnishes of less specific gravity than water, or, in other words, lacquers or varnishes which have no affinity for water and are specifically lighter than the same, the drying of the cleaned surfaces previous to the application of the varnish or lacquer is rendered unnecessary, as the work after rinsing off can, while still set, be dipped into the lacquer or varnish. The water which may be clinging to the articles when immersed in the lacquer or varnish will be loosened by the motion of the same in dipping or by moving them about in the lacquer specially for that object, and will sink to the bottom of the vat, separating from the lacquer by gravity and forming a well-defined underlying layer. When this layer becomes so thick as to be in the way or to interfere with the lacquering, it can be drawn off, or the top layer of lacquer may be decanted off and the water thrown away.

In the practice of my invention I find particularly useful a lacquer made by dissolving in fusel-oil sandarac, copal, or other resin soluble therein; but I may use generally gum or resin lacquers or varnishes having non-hygroscopic menstrua. I prefer the lacquers of this class manufactured at Springfield, New Jersey, U. S. A.

Any method of dipping and drying the dipped articles suited to the size, shape, and quality of work to be lacquered may be employed. An expeditious method with small articles of an ordinary quality is to place them in a wire dipper, rinse in hot water, dip in a suitable non-hygroscopic lacquer, and after shaking off the surplus lacquer to evaporate the menstruum which holds the lacquer in solution by firing in the manner well known among lacquerers of cheap struck-up brass goods. For a better finished or for larger articles the surplus may be slung off or simply drained off and the drip removed, and the articles then dried in the air or in an oven.

I claim as my invention or discovery—

The improvement in varnishing metal articles by dipping the articles wet into a non-hygroscopic lacquer or varnish lighter than water, and thereby effecting the removal of the water from the article and its separation by gravity from the lacquer or varnish, substantially as described.

In testimony whereof I have signed this specification in the presence of two subscribing witnesses.

CHAS. HARROP.

Witnesses:
CHAS. READ,
CHAS. ONSLOW.